(12) United States Patent
Thompson

(10) Patent No.: US 6,514,300 B2
(45) Date of Patent: Feb. 4, 2003

(54) LOG SYSTEM

(76) Inventor: Eugene R. Thompson, 2703-50th Ave., Lone Rock, IA (US) 50559

( * ) Notice: Subject to any disclaimer, the term of this patent is extended or adjusted under 35 U.S.C. 154(b) by 0 days.

(21) Appl. No.: 09/780,290

(22) Filed: Feb. 9, 2001

(65) Prior Publication Data

US 2002/0139042 A1 Oct. 3, 2002

(51) Int. Cl.[7] ................................. C10L 5/00
(52) U.S. Cl. ............................ 44/535; 44/589; 44/605
(58) Field of Search ........................... 44/535, 589, 605

(56) References Cited

U.S. PATENT DOCUMENTS 4,219,573 A * 8/1980 Borek ........................ 426/107
5,868,804 A * 2/1999 Williams ..................... 44/535
6,017,373 A * 1/2000 Frisch ......................... 44/535

* cited by examiner

Primary Examiner—Cephia D. Toomer

(57) ABSTRACT

A log system for providing a log system that is easy to light which burns longer and cleaner than conventional logs. The log system includes a housing comprised of a flammable material and a plurality of corn kernels contained within the housing which provide fuel to a fire. A copper member may be included within the housing for adding visual effects to the flame. A securing string may be attached about the housing for securing the housing in one piece.

19 Claims, 6 Drawing Sheets

LOG SYSTEM

BACKGROUND OF THE INVENTION

FIELD OF THE INVENTION

The present invention relates generally to fire log devices and more specifically it relates to a log system that is easy to light which burns longer and cleaner than conventional logs.

DESCRIPTION OF THE PRIOR ART

Logs have been in use for years. A conventional log is simply comprised of a piece of wood from various types of trees. Modern logs are comprised of particulate wood material bonded together into a cylindrical structure that are commonly wrapped in a flammable wrapping to initiate the fire.

Conventional log devices are difficult to ignite by conventional means and often times require the user to apply a flammable chemical which can be dangerous to ignite and cause significant pollution. Another problem with convention log devices is that they can be extremely messy to utilize with portions of the log such as the bark falling from the log onto the floor of a user's home. Another problem with conventional log devices is that they need to be replaced after a relatively short period of time with a fresh log.

While these devices may be suitable for the particular purpose to which they address, they are not as suitable for providing a log system that is easy to light which burns longer and cleaner than conventional logs. Conventional logs are difficult to light and emit undesirable pollutants.

In these respects, the log system according to the present invention substantially departs from the conventional concepts and designs of the prior art, and in so doing provides an apparatus primarily developed for the purpose of providing a log system that is easy to light which burns longer and cleaner than conventional logs.

SUMMARY OF THE INVENTION

In view of the foregoing disadvantages inherent in the known types of log devices now present in the prior art, the present invention provides a new log system construction wherein the same can be utilized for providing a log system that is easy to light which burns longer and cleaner than conventional logs.

The general purpose of the present invention, which will be described subsequently in greater detail, is to provide a new log system that has many of the advantages of the log devices mentioned heretofore and many novel features that result in a new log system which is not anticipated, rendered obvious, suggested, or even implied by any of the prior art log devices, either alone or in any combination thereof.

To attain this, the present invention generally comprises a housing comprised of a flammable material and a plurality of corn kernels contained within the housing which provide fuel to a fire. A copper member may be included within the housing for adding visual effects to the flame. A securing string may be attached about the housing for securing the housing in one piece.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a log system that will overcome the shortcomings of the prior art devices.

A second object is to provide a log system for providing a log system that is easy to light which burns longer and cleaner than conventional logs.

Another object is to provide a log system that does not utilize non-flammable materials in the construction.

An additional object is to provide a log system that may be utilized as a portable seat.

A further object is to provide a log system that provides a pleasant appearing flame.

Another object is to provide a log system that may be easily transported.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
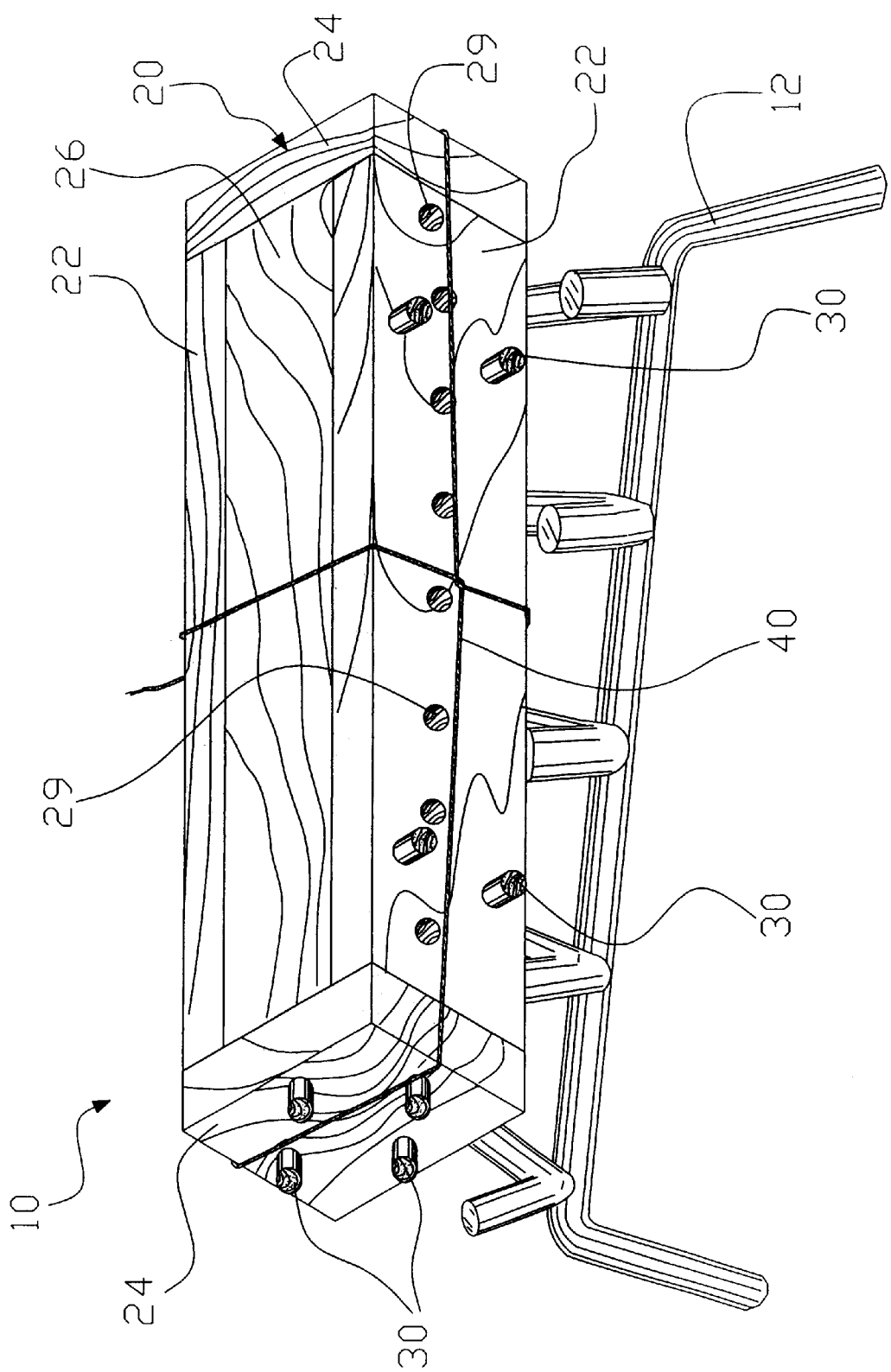
FIG. 1 is an upper perspective view of the present invention positioned within a grate.

Turning now descriptively to the drawings, in which similar reference characters denote similar elements throughout the several views, FIGS. 1 through 6 illustrate a log system 10, which comprises a housing 20 comprised of a flammable material and a plurality of corn kernels 50 contained within the housing 20 which provide fuel to a fire.

A copper member 60 may be included within the housing 20 for adding visual effects to the flame. A securing string 40 may be attached about the housing 20 for securing the housing 20 in one piece. The log system 10 may be positioned within an outdoor fire or upon a grate 12.

Figure 2:
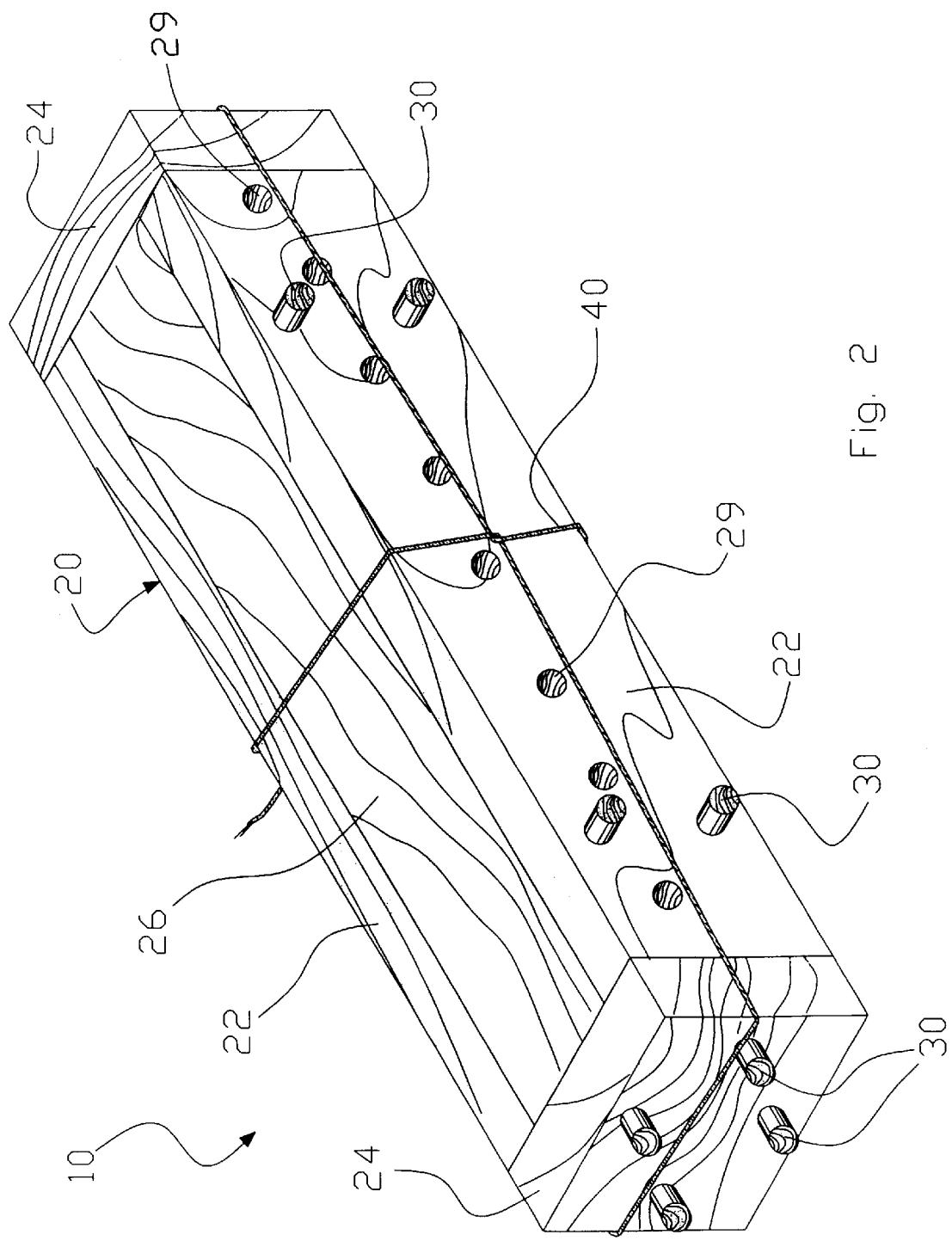
FIG. 2 is an upper perspective view of the present invention.

As shown in FIGS. 1 through 6 of the drawings, the housing 20 is comprised of a flammable material such as but not limited to wood. The housing 20 is a rigid structure defining an interior cavity for the storage of a plurality of corn kernels 50, solid or crushed. The housing 20 preferably has a rectangular shape as best shown in FIG. 2 of the drawings.

Figure 3:
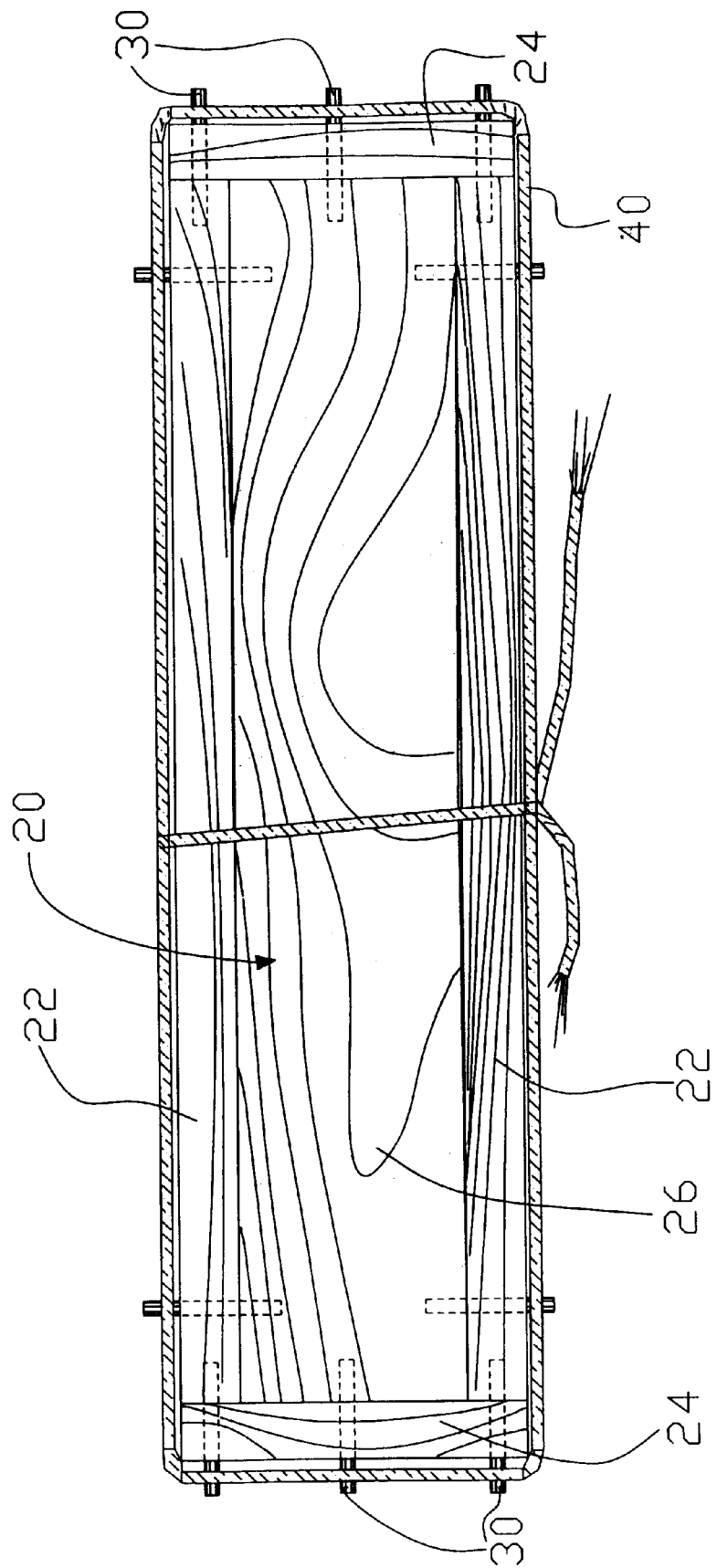
FIG. 3 is a top view of the present invention.
Figure 6:
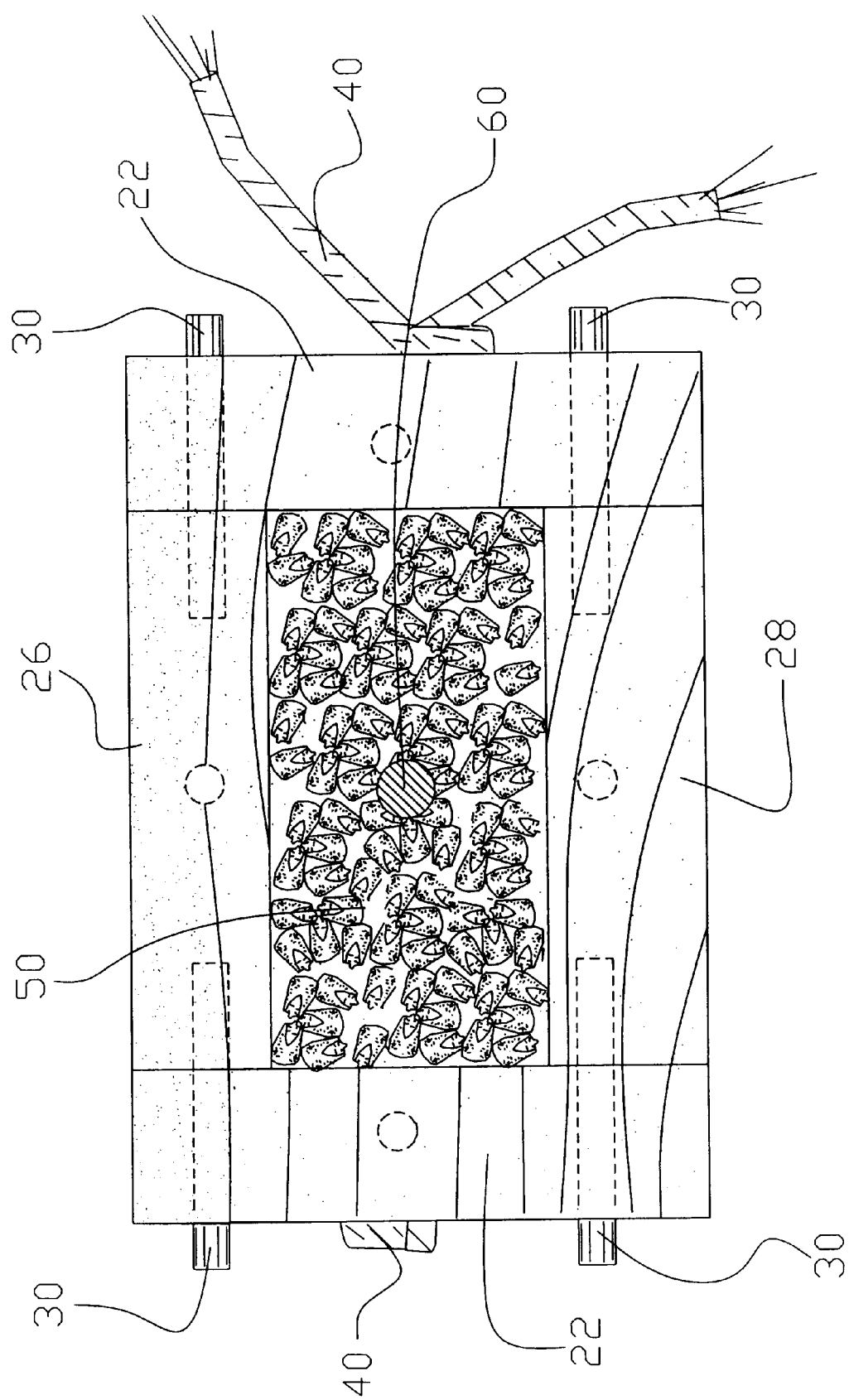
FIG. 6 is a cross sectional view taken along line 6—6 of FIG. 4.

As shown in FIGS. 1 through 6 of the drawings, the housing 20 is preferably comprised of a pair of opposing end members 24, a pair of side members 22, a top member 26 and a lower member 28. The pair of side members 22 are attached between the opposing end members 24 substantially parallel to one another as best illustrated in FIGS. 2 and 3 of the drawings. The top member 26 and the lower member 28 are attached between the opposing end members 24 and the side members 22 as best illustrated in FIGS. 2, 3 and 6 of the drawings.

The opposing end members 24, the pair of side members 22, the top member 26 and the lower member 28 are preferably attached to one another utilizing a plurality of wood pegs 30 as further illustrated in FIGS. 1 through 6 of the drawings. The wood pegs 30 are inserted into apertures within the housing 20 thereby retaining the pair of side members 22, the top member 26 and the lower member 28 in the desired location. A length of securing string 40 is preferably secured about the housing 20 to help maintain the desired structure of the housing 20 in the event one or more of the wood pegs 30 become loosened from the housing 20. The securing string 40 is preferably comprised of a flammable material which are well-known in the art. The length of securing string preferably surrounds the housing 20 along a longitudinal and latitudinal axis forming a cross pattern for securing the pair of end members 24, the pair of side members 22, the top member 26 and the lower member 28.

As shown in FIG. 6 of the drawings, a plurality of corn kernels 50 are positioned within the interior cavity of the housing 20 for providing fuel to the fire. It is preferable that the plurality of corn kernels fill at least 90% of a volume of the interior cavity of said housing 20, however greater or less percentages may be utilized. The corn kernels 50 may either be fully or partially crushed or whole in structure. The corn kernels 50 may also be comprised of various corn varieties.

As shown in FIG. 6 of the drawings, a copper member 60 may be positioned within the plurality of corn kernels 50 to provide an increased visual display during the burning of the plurality of corn kernels 50. The copper member 60 may be comprised of various structures including tubular and solid. When the copper member 60 is heated by the burning of the surrounding corn kernels 50 a chemical reaction occurs that produces gases that are ignited into various colors that are emitted throughout the fire. The process continues until the copper member 60 is exhausted where after the chemical reactions will decrease along with the various colors emitted.

Figure 4:
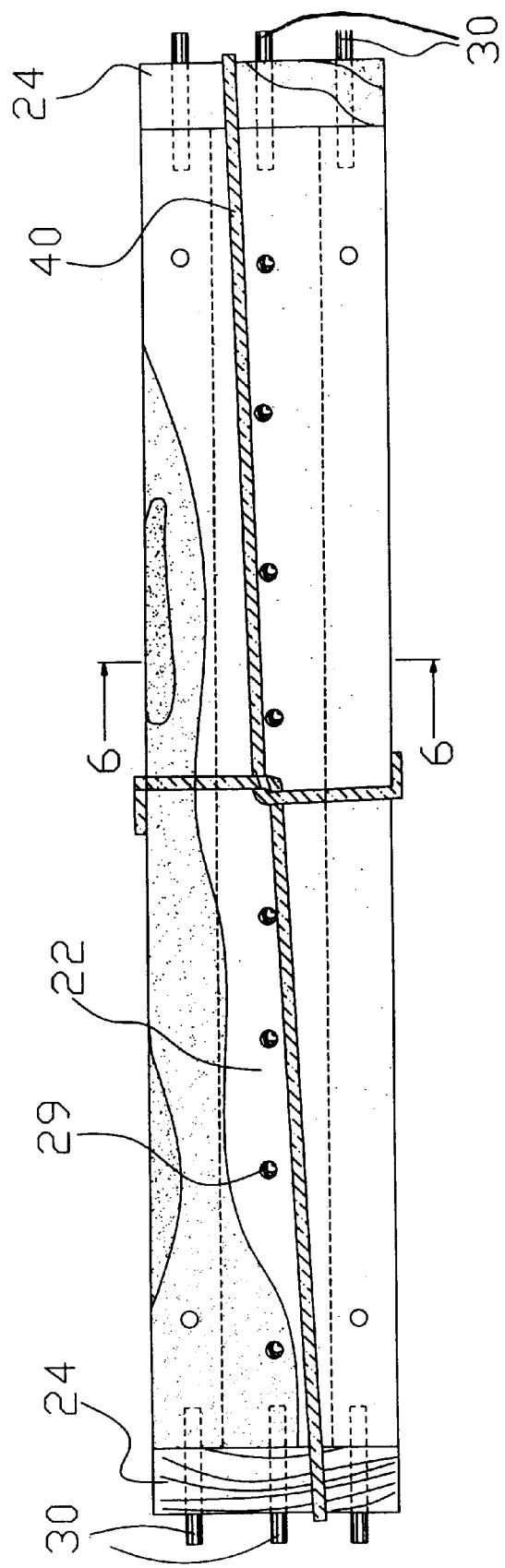
FIG. 4 is a side view of the present invention.
Figure 5:
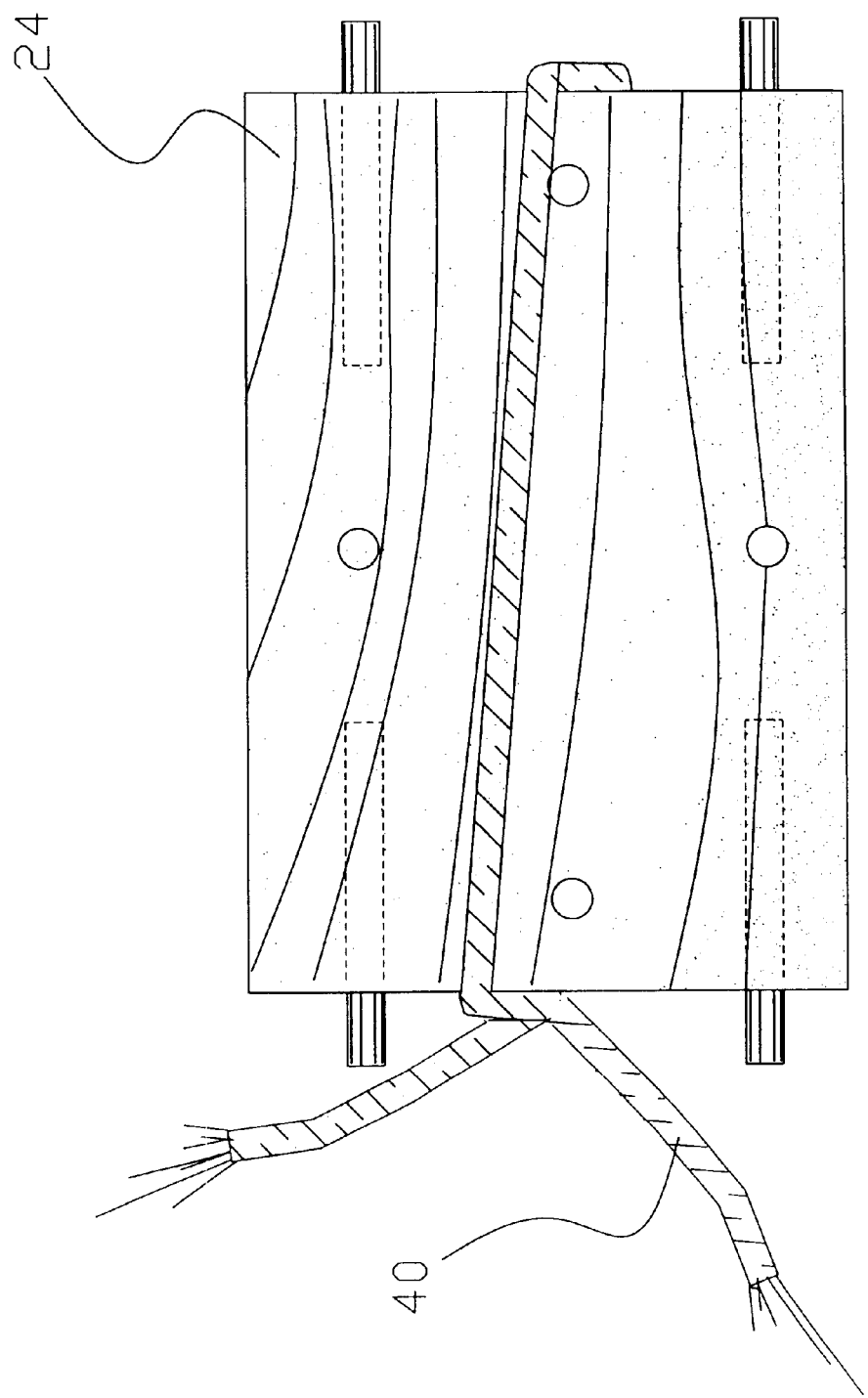
FIG. 5 is an end view of the present invention.

As shown in FIGS. 1, 2 and 4 of the drawings, a plurality of vents 29 extend through the opposing side members 22. The vents 29 are preferably positioned near an upper portion of the side members 22. The vents 29 allow for increased burning of the corn kernels 50 within the housing 20 by allowing oxygen to enter and gases to escape from within.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A log system, comprising:
   a housing having an interior cavity and comprised of a burnable wood material, wherein said housing has a rectangular shape; and
   a plurality of corn kernels within said interior cavity of said housing, wherein said plurality of corn kernels fill at least 90% of a volume of said interior cavity of said housing and wherein said plurality of corn kernels are whole kernels.

2. The log system of claim 1, wherein said plurality of corn kernels include at least a portion of crushed corn kernels.

3. The log system of claim 1, wherein said housing is comprised of a pair of end members, a pair of side members extending between said pair of end members, a top member extending between said pair of end members and said pair of side members, and a lower member extending between said pair of end members and said pair of side members opposite of said top member.

4. The log system of claim 1, wherein said housing is comprised of a pair of end members, a pair of side members extending between said pair of end members secured by a plurality of wood pegs, a top member extending between said pair of end members and said pair of side members secured by a plurality of wood pegs, and a lower member extending between said pair of end members and said pair of side members opposite of said top member secured by a plurality of wood pegs.

5. The log system of claim 1, including a length of securing string surrounding said housing along a longitudinal and latitudinal axis forming a cross pattern.

6. The log system of claim 4, wherein said pair of side members include a plurality of vents within an upper portion thereof.

7. The log system of claim 1, including a copper member positioned within said plurality of corn kernels.

8. The log system of claim 7, wherein said plurality of corn kernels include at least a portion of crushed corn kernels.

9. The log system of claim 7, wherein said housing is comprised of a pair of end members, a pair of side members extending between said pair of end members, a top member extending between said pair of end members and said pair of side members, and a lower member extending between said pair of end members and said pair of side members opposite of said top member.

10. The log system of claim 7, wherein said housing is comprised of a pair of end members, a pair of side members extending between said pair of end members secured by a plurality of wood pegs, a top member extending between said pair of end members and said pair of side members secured by a plurality of wood pegs, and a lower member extending between said pair of end members and said pair of side members opposite of said top member secured by a plurality of wood pegs.

11. The log system of claim 7, including a length of securing string surrounding said housing along a longitudinal and latitudinal axis forming a cross pattern.

12. The log system of claim 10, wherein said pair of side members include a plurality of vents within an upper portion thereof.

13. A burnable log device, comprising:

a housing having an interior cavity and comprised of a burnable wood material; and a plurality of corn kernels within said interior cavity of said housing.

14. The burnable log device of claim 13, wherein said plurality of corn kernels include at least a portion of crushed corn kernels.

15. The burnable log device of claim 13, wherein said housing is comprised of a pair of end members, a pair of side members extending between said pair of end members, a top member extending between said pair of end members and said pair of side members, and a lower member extending between said pair of end members and said pair of side members opposite of said top member.

16. The burnable log device of claim 13, wherein said housing is comprised of a pair of end members, a pair of side members extending between said pair of end members secured by a plurality of wood pegs, a top member extending between said pair of end members and said pair of side members secured by a plurality of wood pegs, and a lower member extending between said pair of end members and said pair of side members opposite of said top member secured by a plurality of wood pegs.

17. The burnable log device of claim 16, wherein said pair of side members include a plurality of vents within an upper portion thereof.

18. The burnable log device of claim 13, including a length of securing string surrounding said housing along a longitudinal and latitudinal axis forming a cross pattern.

19. A log system, comprising:

a housing having an interior cavity, wherein said housing is constructed of a burnable material;

a plurality of corn kernels within said interior cavity of said housing, wherein said plurality of corn kernels fill at least 90% of a volume of said interior cavity of said housing and wherein said plurality of corn kernels are whole kernels; and a copper member positioned within said plurality of corn kernels.

* * * * *